United States Patent
Cochran

(10) Patent No.: US 11,267,962 B2
(45) Date of Patent: Mar. 8, 2022

(54) METHOD FOR PRODUCING A THERMOPLASTIC MOLDING COMPOSITION COMPRISING A STYRENE POLYMER AND A LUBRICANT AND THE THERMOPLASTIC MOLDING COMPOSITION

(71) Applicant: INEOS STYROLUTION GROUP GMBH, Frankfurt am Main (DE)

(72) Inventor: Thomas W. Cochran, Channahon, IL (US)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 72 days.

(21) Appl. No.: 16/349,433

(22) PCT Filed: Nov. 6, 2017

(86) PCT No.: PCT/EP2017/078320
§ 371 (c)(1),
(2) Date: May 13, 2019

(87) PCT Pub. No.: WO2018/087037
PCT Pub. Date: May 17, 2018

(65) Prior Publication Data
US 2019/0300691 A1 Oct. 3, 2019

(30) Foreign Application Priority Data

Nov. 14, 2016 (EP) ..................... 16198576

(51) Int. Cl.
*C08L 25/06* (2006.01)
*C08K 5/098* (2006.01)
*C08L 9/06* (2006.01)
*C08K 5/09* (2006.01)

(52) U.S. Cl.
CPC ............... *C08L 25/06* (2013.01); *C08K 5/09* (2013.01); *C08K 5/098* (2013.01); *C08L 9/06* (2013.01); *C08L 2203/30* (2013.01); *C08L 2205/06* (2013.01); *C08L 2207/04* (2013.01)

(58) Field of Classification Search
CPC ........ C08L 9/06; C08L 25/06; C08L 2205/06; C08L 2203/30; C08L 2207/04; C08K 5/09; C08K 5/098
See application file for complete search history.

(56) References Cited

U.S. PATENT DOCUMENTS

| 4,704,330 A | 11/1987 | Moore et al. |
| 5,543,461 A | 8/1996 | Nke-Aka et al. |
| 5,861,455 A | 1/1999 | Reddy et al. |
| 6,124,385 A | 9/2000 | Honl et al. |
| 6,613,837 B2 | 9/2003 | Reddy et al. |
| 2006/0160928 A1* | 7/2006 | Cleveland ............... C08J 9/32 523/200 |
| 2011/0200773 A1* | 8/2011 | Kolditz ............... C08L 23/14 428/35.7 |

FOREIGN PATENT DOCUMENTS

| CN | 104119556 A | 10/2014 |
| CN | 103819865 B | 4/2016 |
| DE | 19648799 A1 | 5/1998 |
| EP | 0770632 A2 | 5/1997 |
| EP | 2354168 A1 | 8/2011 |
| JP | H04342730 A | 11/1992 |
| JP | 08300389 A | 11/1996 |
| JP | 2005139431 A | 6/2005 |

OTHER PUBLICATIONS

Plastics Infomart, Understanding the Meaning and Process of Plastic Masterbatch, 2015, p. 1-2.*
Supreme Petrochemical; High Impact Polystyrene (HIPS) Material Datasheet, 2006, p. 1-2.*
Sabic; SABIC® PS 825 Material Datasheet, 2007, p. 1.*
Strobl, G.; The Physics of Polymers: Concepts for Understanding Their Structures and Behavior, 2007, p. 105.*
Lynwood, C.; Polystyrene: Synthesis, Characteristics, and Applications, 2014, p. 32.*
Intratec; High Impact Polystyrene Production, 2019, p. 6-16.*
Tolinski, M.; Additives for Polyolefins: Getting the Most Out of Polypropylene, Polyethylene and TPO, 2015, p. 177-182.*
International Preliminary Report on Patentability in International Application No. PCT/EP2017/078320, dated Nov. 9, 2018.
Echte et al., "Half a Century of Polystyrene—A Survey of the Chemistry and Physics of a Pioneering Material", Agnew. Chem. Int. Ed. Engl., 20, 1981, pp. 344-361.

* cited by examiner

*Primary Examiner* — Robert S Jones, Jr.
(74) *Attorney, Agent, or Firm* — J.A. Lindeman & Co., PLLC

(57) ABSTRACT

The invention is directed to a method for producing a thermoplastic molding composition comprising at least one styrene polymer and at least one lubricant, selected from fatty acids and fatty acids derivatives, wherein the method encompasses the preparation of a master batch polymer composition, comprising at least one styrene polymer having a melt flow rate (measured according to ASTMD1238, 200° C./5 kg) in the range of 2 to 10 g/10 min; and 10 to 40% by weight, based on the master batch polymer composition, of the lubricant. In particular the styrene polymer is selected from standard polystyrenes (general purpose polystyrene (GPPS)) and high impact polystyrenes(HIPS).

20 Claims, No Drawings

METHOD FOR PRODUCING A THERMOPLASTIC MOLDING COMPOSITION COMPRISING A STYRENE POLYMER AND A LUBRICANT AND THE THERMOPLASTIC MOLDING COMPOSITION

The present invention is directed to a method for producing a thermoplastic molding composition comprising at least one styrene polymer and at least one lubricant, selected from fatty acids and fatty acids derivatives, wherein the method encompasses the preparation of a master batch polymer composition, comprising at least one styrene polymer having a melt flow rate (measured according to ASTM D 1238, 200° C./5 kg) in the range of 2 to 10 g/10 min; and 10 to 40% by weight, based on the masterbatch polymer composition, of the lubricant. In particular the styrene polymer is selected from standard polystyrenes (also referred to as general purpose polystyrene; GPPS) and high impact polystyrenes (HIPS).

Further the invention is directed to a polymer composition, comprising solid particles made of a master batch polymer composition consisting of 60 to 90% by weight of at least one styrene polymer having a melt flow rate (measured according to ASTM D 1238, 200° C./5 kg) in the range of 2 to 10 g/10 min, and 10 to 40% by weight of at least one lubricant (component B) selected from fatty acids or fatty acids derivatives, and solid particles comprising at least one second styrene polymer wherein said solid particles are different from the first solid particles.

Fatty acids and fatty acid derivatives, such as metal stearates, in particular zinc stearate, are often used in polystyrene compositions as lubricants to reduce frictional forces between the molten or solid polymer and metal surfaces. This is particularly useful for polystyrene compositions for injection molding in order to easing the ejection of plastic parts from molds, where otherwise frictional forces would cause sticking and potentially damage to the part or to the mold. Other common lubricants for polymers are for example hydrocarbon waxes. The document U.S. Pat. No. 5,543,461 describes a thermoplastic high impact polystyrene composition comprising a combination of mineral oil and polyisobutylene as lubricant. The document EP-A 0 770 632 describes high impact polystyrene compositions with improved environmental stress cracking resistance, which comprises from 1 to 5% by weight of a low molecular weight polybutene. The polybutene additive may be added to the thermoplastic matrix e.g. by injection of the polybutene into the thermoplastic melt before or during its formation, i.e. before polymerization.

Commonly the lubricant, such as metal stearate, is added into the polymerization reactor during or before polymerization, so that it can be well mixed with the polymer. This method has disadvantages in that fatty acids and fatty acid derivatives, in particular metal stearate, are known to contribute to the formation of fouling on high temperature surfaces in the devolatilization section of the plant. Such fouling products can then sluff off into the product becoming a source of objectionable "black specks" visible on the surface of the polymer product.

Another common method of adding the lubricant, such as metal stearate, into the polymer composition is to inject it as a molten stream into the molten polymer downstream of the devolatilization section of the plant, but up steam of some mixing device, such as a static mixer or extruder. This has the disadvantage of high installation cost, particularly if added as a later retrofit, and high energy input to force the viscose polymer (e.g. polystyrene) stream through the mixing device.

The document U.S. Pat. No. 4,704,330, describes a method of preparation of a thermoplastic polymer, in particular a polystyrene resin, wherein zinc stearate is applied by contacting the polymer with atomized droplets of molten zinc stearate while supporting and conveying the particles by a moving steam of gas. The disadvantage to the method described here is that the dusting of zinc stearate does not adhere adequately to the pellet surface, thereby creating free zinc stearate dust, which is not desirable.

There is a high need for an inexpensive and effective method for compounding fatty acids and fatty acid derivatives, in particular selected from metal stearate, e.g. zinc stearate, as lubricant into styrene polymers.

It was surprisingly found that a master batch concentrate (referring to polymer composition P1) of 10% to 40% by weight of metal stearate in a polystyrene having a melt flow rate (measured according to ASTM D 1238, 200° C./5 kg) of 2 to 10 g/10 min can be produced by compounding the metal stearate and polystyrene (in particular GPPS or HIPS) using a single or twin screw extruder to form pellets, e.g. cylindrical pellets. Said master batch concentrate can be added to any second styrene polymer in a suitable amount to give the desired lubrication effect. The master batch concentrate can preferably mixed with the second styrene polymer by dry blending. It was found that the downstream processing equipment, such as injection molding machines and extruders, provide sufficient mixing to disperse the master batch concentrate homogenously and following the metal stearate is enabled to effect sufficient lubrication.

The present invention is directed to a method for producing a thermoplastic molding composition P, comprising at least one styrene polymer and at least one lubricant B, selected from fatty acids and fatty acids derivatives, wherein the method encompasses the following steps:

a) preparation of a polymer composition P1 comprising:
60 to 90% by weight, preferably 70 to 85% by weight, based on the polymer composition P1, of at least one styrene polymer A1 having a melt flow rate, measured according to ASTM D 1238, 200° C./5 kg, in the range of 2 to 10 g/10 min, preferably 4 to 9 g/10 min, and
10 to 40% by weight, preferably 15 to 30% by weight, based on the polymer composition P1, of at least one lubricant B selected from fatty acids and fatty acid derivatives,
by mixing the at least one lubricant B into the molten styrene polymer A1 and cooling the mixture, whereby particles made of polymer composition P1 are obtained, b) preparation of a polymer composition P2 by mixing the particles made of polymer composition P1 obtained in step a) with at least one styrene polymer A2 and optionally one or more further additives C;

wherein the styrene polymer A1 and the styrene polymer A2 are either the same or different. Preferably the styrene polymers A1 and A2 are different from each other, in particular they differ in view of their melt flow rates.

Styrene Polymers A1 and A2

As used herein, the term "styrene polymer" refers to a polymer that contains monomer residues from one or more monomers selected from styrene, p-methyl styrene, tertiary butyl styrene, dimethyl styrene, nuclear brominated or chlorinated derivatives thereof and combinations thereof.

According to a preferred embodiment the styrene polymers A1 and/or A2 comprises at least 30% by weight, more preferably at least 60% by weight, in particular preferably at least 85% by weight, based on the polymer A1 or A2, of one or more monomers selected from styrene, p-methyl styrene, tertiary butyl styrene, dimethyl styrene, nuclear brominated or chlorinated derivatives thereof and combinations thereof. Preferably the styrene polymers A1 and/or A2 comprises at least 30% by weight, more preferably at least 60% by weight, in particular preferably at least 85% by weight, based on the polymer A1 or A2, of styrene.

Styrene polymers A1 and/or A2 are preferably selected from high-impact polystyrenes (HIPS) and standard polystyrenes (also referred to as general purpose polystyrene GPPS). Furthermore, the styrene polymers A1 and/or A2 may be mixtures of high-impact polystyrenes (HIPS) and standard polystyrenes (GPPS). In a preferred embodiment the styrene polymers A1 and A2 consists of 100% by weight, based on A1 res. A2 of HIPS.

In a preferred embodiment the styrene polymers A1 and A2 are selected from high-impact polystyrenes (HIPS). The preparation, structure, and properties of said polystyrenes are described in detail in the literature, e.g. Echte, Haaf, Hambrecht in Angew. Chem. (Int. Ed. Engl.) 20, 344-361, (1981); and in Kunststoffhandbuch, edited by Vieweg and Daumiller, Vol. 4 "Polystyrol", Carl-Hanser-Verlag Munich (1996).

As used herein, the term "high impact polystyrene" or "HIPS" refers to rubber modified polystyrene, comprising a polystyrene matrix and an elastomeric material which typically is an impact modifying polymer described in the following. For example HIPS can be prepared by adding an polybutadiene rubber, or other elastomeric materials, into styrene monomer during polymerization, so it can become chemically bonded to the polystyrene, forming a graft copolymer which helps to incorporate impact modifying polymers into the final resin composition.

As used herein, the term "elastomeric materials" refers to a material that deforms when stress is applied and returns to its original configuration when the stress is removed.

Typically, the elastomeric materials that can be used to make high impact polystyrene (HIPS) is one or more impact modifying polymer containing monomer residues from styrene, 1,3-butadiene, isoprene, acrylonitrile, ethylene, $C_3$ to $C_{12}$ alpha olefins, and combinations thereof.

As used herein, the term "monomer residues" or "polymer made of" or "polymer comprising" specific monomers refers to the monomeric repeat unit in a polymer derived from polymerization of the specific monomers which contain a polymerizable unsaturated group. As used herein, the term "polymer" is meant to encompass homopolymers, copolymers and graft copolymers.

In particular embodiments of the invention, the impact modifying polymer can be a rubbery polymer containing an ethylenic unsaturation. In some cases, the impact modifying polymer can be a co- or homopolymer of one or more $C_{4-6}$ conjugated diolefins.

In some particular embodiments, the styrene polymers A1 and/or A2 are selected from high-impact polystyrenes comprising a polystyrene matrix and at least one impact modifying polymer selected from butadiene rubbers (BR) and styrene-butadiene rubbers (SBR).

The butadiene rubber is in particular a medium or high cis-polybutadiene. Typically the high cis-polybutadiene contains not less than 90% by weight, in some cases more than about 93% by weight, based on the polybutadiene, of monomer units in the cisconfiguration. In many instances, medium cis-polybutadiene has a cis content from about 30 to 50% by weight, in some cases from about 35 to 45% by weight, based on the polybutadiene.

Suitable butadiene rubbers that can be used in the invention include those commercially available from various sources; for example Buna CB 550 available from Arlanxeo Corporation (Pittsburgh, Pa.); PB 5800-Schkopau available from the Trinseo LLC (Berwyn, Pa.); and Diene® 55AC15 and Diene® 70AC15 available from Firestone Polymers LLC (Akron, Ohio).

Furthermore, the impact modifying polymer may be selected from structurally modified specific butadiene rubbers—for example, with a 1,4-cis and/or 1,4-trans fraction or 1,2- and 1,4 linkage fraction modified relative to conventional rubbers.

Furthermore, instead of butadiene rubber, it is also possible to use other diene rubbers, and also elastomers of the type of ethylene-propylene-diene copolymer (EPDM rubber), and also hydrogenated diene rubbers, as impact modifying polymer.

The impact modified styrene polymer A1 and/or A2 can be prepared by polymerizing one or more of the aforementioned styrene monomers, selected from styrene, p-methyl styrene, tertiary butyl styrene, dimethyl styrene, nuclear brominated or chlorinated derivatives thereof and combinations thereof, in the presence of the impact modifying polymer. For example methods for preparation are disclosed in U.S. Pat. No. 5,543,461 (see col. 5, I. 3 to 42), U.S. Pat. No. 5,861,455 (see col. 3, I. 42 to col. 4, I. 17) and U.S. Pat. No. 6,613,837 (see col. 3, 1.55 to col. 4, I. 23), the relevant portions of which are herein incorporated by reference.

In particular embodiments of the invention, the styrene polymers A1 and/or A2 are polymers selected from INEOS Styrolution® PS series, for example the styrene polymers A1 and/or A2 are high impact polystyrene (HIPS) selected from from PS 6210, PS 6220, PS 7800, PS 5600, PS 5400, PS 2710, PS 7120, PS 5300, PS 5410 (all available from Ineos Styrolution®, Germany or USA, Illinois).

In particular the styrene polymers A1 and/or A2 are high-impact polystyrenes which comprises 80 to 95% by weight, preferably 85 to 96% by weight of a styrene matrix, preferably polystyrene, and 5 to 20% by weight, preferably 4 to 15% by weight, of at least one impact modifying polymer, preferably a polybutadiene and/or a styrenebutadiene copolymer.

The impact modifying polymer particles in the styrene matrix of styrene polymers A1 and/or A2 typically have an average particle size (measured by common methods) of at least about 0.25 µm, in some cases at least about 0.5 µm and in other cases at least about 1 µm. Preferably the average particle size of impact modifying polymer particles in the styrene matrix can be up to about 12 µm, in some cases up to about 11 µm and in other cases up to about 10 µm. The average particle size of the impact modifying polymer particles in the styrene matrix can be any value or range between any of the values recited above. The impact modifying polymer particle size is typically measured by analyzing the spectra obtained from light scattering through a solution of the particles in a polystyrene solvent, such as methyl ethyl ketone or ethyl acetate.

Instruments suitable for this measurement include Horiba's Model LA-920 or Beckman Coulter's LS 13 320.

Suitable standard polystyrenes or also called general purpose polystyrenes (GPPS) are prepared by the method of anionic or radical polymerization of styrene or styrene derivatives mentioned above. Preferably GPPS is prepared by polymerization of styrene or a mixture of styrene with any other copolymerizable monomer. Preferably GPPS is prepared by polymerization of styrene or a mixture of styrene and one or more monomers selected from p-methyl styrene, tertiary butyl styrene, dimethyl styrene, nuclear brominated or chlorinated derivatives thereof and combinations thereof. Generally, the non-uniformity of the polymer, which may be influenced by the polymerization method, is of minor importance here.

Typically the weight average molecular weight ($M_w$) of the styrene polymers A1 and/or A2 ranges from 50,000 to 500,000 g/mol, preferably from 120,000 to 250,000 g/mol, more preferably from 130,000 to 240,000 g/mol. In particular the weight average molecular weight ($M_w$) of the styrene polymer A1 ranges from 170 000 to 250 000 g/mol, preferably from 180,000 to 207,000 g/mol, more preferably about 190,000 g/mol. In particular the weight average molecular weight ($M_w$) of the styrene polymer A2 ranges from 120 000 to 240 000 g/mol, preferably from 132,000 to 207,000 g/mol, more preferably about 165,000 g/mol. Typically molecular weight values are determined using gel permeation chromatography (GPC) using appropriate polystyrene standards. Unless otherwise indicated, the molecular weight values indicated herein are weight average molecular weights (Mw).

Typically, the styrene polymers A1 and/or A2 may be GPPS or HIPS having a melt flow rate (measured according to ASTM D 1238, 200° C./5 kg) in the range of 1 to 15 g/10 min, preferably 2 to 10 g/10 min. Preferably, GPPS and/or HIPS, whose toluenesoluble fraction has an average molecular weight $M_w$ in the range of 50,000 to 500,000 g/mol, are used as component A1 and/or A2.

In a particular preferred embodiment the styrene polymer A1 is selected from high-impact polystyrenes (HIPS) having a melt flow rate of 2 to 10 g/10 min (measured according to ASTM D 1238, 200° C./5 kg) of 4 to 10 g/10 min, more preferably 5 to 9 g/10 min; also preferably 7 to 9 g/10 min and the styrene polymer A2 is selected from standard polystyrenes (GPPS), high-impact polystyrenes (HIPS) and mixtures thereof.

The at least one styrene polymer A1 has a melt flow rate (measured according to ASTM D 1238, 200° C./5 kg) in the range of 2 to 10 g/10 min, preferably 4 to 10 g/10 min, more preferably 5 to 9 g/10 min, in particular preferably 7 to 9 g/10 min. The second styrene polymer A2 can be the same or different to styrene polymer A1. In a preferred embodiment the at least one styrene polymer A2 is different from styrene polymer A1 and has a melt flow rate (measured according to ASTM D 1238, 200° C./5 kg) which is lower than the melt flow rate of styrene polymer A1. In particular the at least one styrene polymer A2 has a melt flow rate (measured according to ASTM D 1238, 200° C./5 kg) in the range of 2 to 4.9 g/10 min, preferably 2.5 to 3.9 g/10 min. Respectively, in this preferred embodiment the melt viscosity of the at least one styrene polymer A2 is higher than melt viscosity of styrene polymer A1. Surprisingly, it has been found that the dispersion of the lubricant B in the at least one styrene polymer A1 can be improved when the melt flow rate is in the given ranges.

In particular GPPS and/or HIPS, which have been equipped with one or more additives C, such as, for example, mineral oil (e.g. white oil), stabilizer, antistats, flame retardants or waxes, can be used as A1 and/or A2.

Lubricant B

The polymer composition P1 according to the invention comprises 10 to 40% by weight, preferably 15 to 30% by weight, based on the polymer composition P1, of at least one lubricant B selected from fatty acids and fatty acid derivatives. Preferably, the at least one lubricant B is selected from fatty acids and fatty acid derivatives, which are selected from fatty acid esters (e.g. stearyl stearate, glycerol esters of fatty acids, fatty acid methyl esters FAME), fatty acid amides (e.g. erucamide, oleamide, stearamide) and metal salts of fatty acids (e.g. salts of at least one metal selected from calcium, zinc, magnesium, lead, aluminum, sodium, potassium, tin, barium, and cobalt).

Fatty acids are carbon acids R—COOH wherein R is an linear or branched, saturated, mono unsaturated or multiple unsaturated alkyl radical having 3 to 29, preferably 9 to 19, more preferably 13 to 17, carbon atoms. The radical R may also be substituted with one or more groups selected from halo, cycloalkyl, hydroxyl, carboxy, and alkoxy. Preferably the radical R is an unsubstituted and unbranched saturated or unsaturated alkyl radical having from 9 to 19 carbon atoms.

Suitable fatty acids and derivatives thereof can be selected from lauric acid, myristic acid, pentadecanoic acid, palmitic acid, margaric acid, stearic acid, arachidic acid and oleic acid as well as mixtures and derivatives thereof. Preferably the at least one lubricant B comprises (preferably consists of) stearic acid and/or derivatives thereof, which are in particular selected from stearates, stearyl amides and stearyl esters. In an preferred embodiment stearic acid and/or derivatives thereof (in particular metal stearates), are the only lubricants used in the inventive method and contained in the inventive compositions.

In a preferred embodiment the lubricant B is at least one metal salt of at least one fatty acid. In particular the lubricant B is a salt of at least one fatty acid mentioned above and a metal selected from calcium, zinc, magnesium, lead, aluminum, sodium, potassium, tin, barium, and cobalt. Preferably the at least one lubricant B is a metal stearate, for example selected from calcium stearate, magnesium stearate, zinc stearate, in particular zinc stearate As a skilled person understands, the fatty acids and respectively derivatives thereof typically are mixtures of different amount of several fatty acids, for example stearic acid is understand being a mixture comprising more than 30% by weight, more preferably more than 50% by weight and most preferably more than 80% by weight of stearic acid.

Further Additives C

In addition, the thermoplastic molding composition P may optionally comprises further additives C, which can typically selected from plastic additives and/or auxiliaries (e.g. plastic processing aids). For example the at least one additive C can be selected from plasticizers, waxes, antioxidants, mineral oil, silicone oil, stabilizers, flame-retardants, mineral fibers, carbon fibers, mineral fillers, dyes, pigments and the like. Said additives C may optionally be present in the thermoplastic molding composition P in an low amount, preferably up 5% by weight, more preferably up to 3% by weight, based on the total thermoplastic molding composition. If a further additive C is present, the amount of the additive C is typically at least 0.01% by weight, preferably at least 0.1% by weight, based on the thermoplastic molding composition P.

Typically, said additives C may be present in the thermoplastic molding composition P in an amount of 0.01 to 19.99% by weight, preferably 0.1 to 10% by weight, more preferably 0.1 to 5% by weight, further preferably 0.1 to 1% by weight, each based on the thermoplastic molding composition P.

Polymer Compositions

The polymer composition P1 prepared in step a) comprises (preferably consists of):

60 to 90% by weight, preferably 70 to 85% by weight, more preferably 75 to 80% by weight, based on the polymer composition P1, of at least one styrene polymer A1, preferably selected from standard polystyrenes (GPPS) or high impact polystyrenes (HIPS), having a melt flow rate, measured according to ASTM D 1238, 200° C./5 kg, in the range of 2 to 10 g/10 min, preferably 4 to 9 g/10 min; and 10 to 40% by weight, preferably 15 to 30% by weight, more preferably 20 to 25% by weight, based on the polymer composition P1, of at least one lubricant B selected from fatty acids and fatty acid derivatives, preferably selected from metal salts of fatty acids, also preferably selected from stearic acid and metal stearates.

In a preferred embodiment the polymer composition P1 consists of the components A1 and B as described above. In principle, it is possible to use further common additive(s) C, e.g. in an amount of 0.01 to 5% by weight, preferably 0.1 to 3% by weight, more preferably 0.1 to 1% by weight, based on P1.

According to the invention the polymer composition P1 is obtained in step a) in form of particles, in particular in form of solid particles. Preferably, the polymer composition P1 is obtained in form of solid particles, such as granulate and/or pellets, having an average particle size in the range of 500 to 10,000 μm (micron), preferably 1,500 to 6,000 μm, more preferably 2,500 to 4,000 μm. Typically the particles exhibit cylindrical and/or spherical form, preferably the particles exhibit cylindrical form.

As used herein the term "solid" means that the substance or mixture is in solid state at standard conditions, i.e. standard ambient temperature and pressure (SATP) of 25° C. and 1 bar.

The thermoplastic molding composition P comprises (preferably consist of) the polymer composition P1, the styrene polymer A2 and optionally one or more further additives C. In particular the sum of styrene polymer A1, styrene polymer A2, the lubricant B and optional additive C, can preferably totals 100% by weight. In particular the minimum and/or maximum amount of the styrene polymer A1 and/or A2 can be adapted so that the sum of the compounds results in 100% by weight. In principle, it is possible to use further common additives C, e.g. in an amount of 0.01 to 5% by weight, preferably 0.1 to 3% by weight, more preferably 0.1 to 1% by weight, based on P. In a preferred embodiment the thermoplastic molding composition consists of the polymer composition P1 and the at least one styrene polymer A2.

In a preferred embodiment the thermoplastic molding composition P, obtained in the inventive method, does not comprise any lubricant selected from fatty acids and fatty acid derivatives beside the lubricant B incorporated in the polymer composition P1.

In a preferred embodiment the thermoplastic molding composition P, obtained in the inventive method, comprises:
0.01 to 20% by weight, preferably 0.5 to 3% by weight, more preferably 0.1 to 1% by weight, based on the composition P, of the polymer composition P1,
80 to 99.99% by weight, preferably 97 to 99.5% by weight, more preferably 99 to 99.9% by weight, based on the composition P, of the at least one styrene polymer A2, and optionally
0 to 19.99% by weight, preferably 0 to 2.5% by weight, more preferably 0 to 0.9% by weight, based on the composition P, of one or more further additives C.

Preferably the polymer composition P2 obtained in step b) is the thermoplastic molding composition P.

Furthermore it is possible to add one or further additive C to the polymer composition P2 to obtain the thermoplastic molding composition P in a further step following step b). Furthermore it is possible to carry out one or more further steps following step b), such as extrusion, granulation or pelletizing, using the polymer composition P2 to obtain the thermoplastic molding composition P.

Step a)

In particular, the inventive method comprises the preparation of a polymer composition P1 by mixing the at least one lubricant B into the molten styrene polymer A1 and cooling the mixture, wherein particles made of polymer composition P1 are obtained, as a first step a).

Preferably, the mixing of the at least one lubricant B and the styrene polymer A1 in step a) is carried out in a single or twin screw extruder. Preferably, the mixing in step a) is carried out at a temperature in the range of 180 to 260° C., preferably 200 to 250° C.

Step b)

In particular, the inventive method comprises the preparation of a polymer composition P2 by mixing the particles made of polymer composition P1 obtained in step a) with at least one second styrene polymer A2 and optionally one or more further additives C. In particular this is following directly after step a).

Preferably the mixing in step b) is effected by mixing the particles made of polymer composition P1 obtained in step a) and particles comprising (or consisting of) the at least one styrene polymer A2, wherein the particles are in solid state during the mixing in step b). The particles comprising the at least one styrene polymer A2 are preferably solid particles, such as pellets and/or granulate.

The particles comprising the at least one styrene polymer A2 can optionally comprise one or more further additives C. Further, it is possible to add one or more further additives C in step b) as separate component.

Preferably, the particles made of polymer composition P1 and the particles comprising the at least one styrene polymer A2 are in solid state during mixing in step b), preferably all components are in solid state during mixing in step b).

More preferably the mixing in step b) is effected by dry blending the particles made of polymer composition P1 and particles comprising the at least one styrene polymer A2 and optional further additives C, meaning that all components are in dry solid state. In particular no water or solvent is used in the mixing step b). In this embodiment the mixing in step b) is carried out at a temperature in the range of 0 to 150° C., preferably 10 to 100° C., more preferably 15 to 50° C.

The mixing in step b) can also be effected by mixing the polymer compositions P1 and the at least one styrene polymer A2 in a molten state, in particular in an extruder or in an injection molding process. In this embodiment the mixing in step b) is carried out at a temperature in the range of 180 to 260° C., preferably 200 to 250° C.

In a preferred embodiment the particles (e.g. pellets or granulate) of polymer composition P1 are evenly dosed into the stream of particles comprising at least one styrene polymer A2 immediately after they are formed (e.g. in an extrusion process). In this preferred embodiment a homogenous mixture of polymer composition P1, which is a master batch concentrate of lubricant B (in particular metal stearate) in the styrene polymer A1, in a styrene polymer product (second styrene polymer A2) is obtained. Said homogenous mixture can be provided directly to customers for injection molding or extrusion processes. In particular said homogenous mixture can be used for the preparation of extruded sheet that is thermoformed into molded articles.

The at least one further additive C, if present, can be added in step b) or mixed with styrene polymer A1 and/or A2 before. In a preferred embodiment the solid particles comprising the at least one styrene polymer A2 does not comprise a lubricant selected from fatty acids and fatty acid derivatives.

In another aspect the present invention is directed to a thermoplastic molding composition P comprising (preferably consisting of):

0.01 to 20% by weight, preferably 0.1 to 20% by weight, preferably 0.05 to 3% by weight, preferably 0.5 to 3% by weight, more preferably 0.1 to 1% by weight, based on the composition P (polystyrene composition P), of solid particles made of polymer composition P1 comprising (preferably consisting of):
  60 to 90% by weight, preferably 70 to 85% by weight, more preferably 80 to 85% by weight, based on the polymer composition P1, of at least one styrene polymer A1, preferably selected from standard polystyrenes (GPPS) or high impact polystyrenes (HIPS), having a melt flow rate, measured according to ASTM D 1238, 200° C./5 kg, in the range of 2 to 10 g/10 min, preferably 4 to 9 g/10 min; and
  10 to 40% by weight, preferably 15 to 30% by weight, more preferably 20 to 25% by weight, based on the polymer composition P1, of at least one lubricant B selected from fatty acids and fatty acid derivatives, preferably selected from metal salts of fatty acids, also preferably selected from stearic acid and metal stearates.
80 to 99.99% by weight, preferably 80 to 99.9% by weight, preferably 97 to 99.95% by weight preferably 97 to 99.5% by weight, more preferably 99 to 99.9% by weight, based on the sum total of the composition P (polystyrene composition P), of solid particles comprising (preferably consisting of) at least one styrene polymer A2; and optionally
0 to 19.99% by weight, preferably 0 to 19.9% by weight, preferably 0 to 2.45% by weight, preferably 0 to 2.5% by weight, more preferably 0 to 0.9% by weight, based on the sum total of the composition P (polystyrene composition P), of one or more further additives C,
wherein the styrene polymer A1 and the styrene polymer A2 are the same or different. Preferably the styrene polymers A1 and A2 are different from each other, in particular they differ in view of their melt flow rates.

In particular the sum of the components P1, A2 and C is 100% by weight. In particular the minimum and/or maximum amount of component A2 can be adapted, so that the sum of components results in 100% by weight. The preferred embodiments, in particular concerning components P, P1, P2, A1, A2, B and C, described in context of the inventive method can be applied to the inventive thermoplastic molding composition P accordingly.

Preferably, the solid particles made of P1 and/or the solid particles comprising at least one styrene polymer A2 have average particle size in the range of 500 to 10,000 μm. Preferably the at least one lubricant B is homogenous distributed in a matrix of styrene polymer A1 in the solid particles made of polymer composition P1.

In a preferred embodiment the invention is directed to thermoplastic molding composition P comprising (preferably consisting of):

0.5 to 3% by weight, based on the composition P (polystyrene composition P), of solid particles made of polymer composition P1 consisting of:
  70 to 85% by weight, based on the polymer composition P1, of at least one styrene polymer A1, selected from standard polystyrenes (GPPS) or high impact polystyrenes (HIPS), having a melt flow rate, measured according to ASTM D 1238, 200° C./5 kg, in the range of 2 to 10 g/10 min preferably 4 to 9 g/10 min; and
  15 to 30% by weight, based on the polymer composition P1, of at least one lubricant B selected from stearic acid and metal stearates;
97 to 99.5% by weight, based on the sum total of the composition P (polystyrene composition P), of solid particles comprising at least one styrene polymer A2; and optionally
0 to 2.5% by weight, based on the sum total of the composition P (polystyrene composition P), of one or more further additives C,
wherein the solid particles made of polymer composition P1 have average particle size in the range of 500 to 10,000 μm, and wherein the at least one lubricant B is homogenous distributed in a matrix of styrene polymer A1 in the solid particles made of polymer composition P1.

Preferably, optional additive C may be incorporated into the solid particles comprising at least one styrene polymer A2 and/or may be added as one or more separate components to the thermoplastic molding composition P.

In a preferred embodiment the thermoplastic molding composition P or the mold produced from the thermoplastic molding composition P shows an content of black specks contamination of about or less than 0.6 mm² black area/m² product.

In particular the solid particles comprising the at least one styrene polymer A2 comprises (preferably consists of):
  80 to 100% by weight, preferably 95 to 99.9% by weight, more preferably 97 to 99.9% by weight, based on the sum total of the solid particles, of at least one styrene polymer A2, preferably selected from GPPS and HIPS, and optionally
  0 to 20% by weight, preferably 0.1 to 5% by weight, more preferably 0.1 to 3% by weight, based on the sum total of the solid particles, of one or more further additives C.

In a preferred embodiment the solid particles comprising at least one styrene polymer A2 does not comprise a lubricant selected from fatty acids and fatty acid derivatives. In a preferred embodiment the thermoplastic molding composition P does not comprise any lubricant selected from fatty acids and fatty acid derivatives beside the lubricant B incorporated in the polymer composition P1.

Further, the invention is directed to a polymer composition P1 comprising (preferably consisting of):
  60 to 90% by weight, preferably 70 to 85% by weight, more preferably 75 to 80% by weight, also preferably 78 to 82% by weight, based on the polymer composition P1, of at least one styrene polymer A1, preferably selected from standard polystyrenes (GPPS) or high impact polystyrenes (HIPS), having a melt flow rate, measured according to ASTM D 1238, 200° C./5 kg, in the range of 2 to 10 g/10 min, preferably 4 to 9 g/10 min; and
  10 to 40% by weight, preferably 15 to 30% by weight, more preferably 20 to 25% by weight, also preferably 18 to 22% by weight, based on the polymer composition P1, of at least one lubricant B selected from fatty acids and fatty acid derivatives, preferably selected from metal salts of fatty acids, also preferably selected from stearic acid and metal stearates.
wherein the polymer composition P1 is in form of solid particles. Preferably, the solid particles have weight average particle size in the range of 500 to 10,000 µm (micron), preferably 1,500 to 6,000, more preferably 2,500 to 4,000 µm. Typically the particles exhibit cylindrical and/or spherical form, preferably the particles exhibit cylindrical form. Preferably the at least one lubricant B is homogenous distributed in a matrix of styrene polymer A1.

Preferably, the particle size distribution of particles made of polymer composition P1 is quite narrow and the particles exhibit nearly the same size. In particular the particle size $D_{90}$, referring to the particle size of which 90% by weight of the particles are smaller than the given value, is in the range of 6,000 to 15,000 µm. In particular the amount of particles having an weight average particle size of less than 500 µm, preferably less than 1,000 µm, is about or less than 1% by weight. In particular the amount of particles having an weight average particle size of more than 10,000 µm, preferably more than 6,000 µm, is about or less than 1% by weight. Preferably the polymer composition P1 exhibits more than 80% by weight, preferably more than 90% by weight, of particles having an weight average particle size of more than 1,500 µm, preferably more than 2,500.

The preferred embodiments, in particular concerning components P1, A1, B and C, described in context of the inventive method can be applied to the inventive thermoplastic molding composition P1 accordingly.

The polymer composition P1 may also be regarded as concentrated master batch to supply a polystyrene (in particular selected from GPPS and HIPS) easily with the lubricant B.

The present invention is also directed to a method for producing a mold wherein the inventive polymer composition P1 is mixed with at least one styrene polymer A2 and subjected to a injection molding process. In particular a dry blend of polymer composition P1 and at least one styrene polymer A2 is subjected to an injection molding process. In particular the inventive thermoplastic polymer composition P as defined above is subjected to an injection molding process.

Typically, the injection molding process may be carried out utilizing a melt temperature in the range of 180 to 260° C., preferably 200 to 250° and a mold temperature in the range of 30 to 100° C., preferably 40 to 80° C.

Further, the present invention is directed to the use of the inventive polymer composition P1 or the inventive thermoplastic molding composition P described above for the preparation of shaped articles for various applications, e.g. applications in automotive sector, electronics, household articles, constructions, healthcare articles, packaging, sports and leisure articles. The shaped articles can be formed by extrusion, injection molding or other usual techniques for processing plastics. In particular the polymer composition P1 or the thermoplastic molding composition P is used in an injection molding process. In particular polymer composition P1 or the inventive thermoplastic molding composition P is used for the preparation of extruded sheet that is thermoformed into molded articles.

The invention is further illustrated by the following examples and claims.

EXAMPLE 1

A polymer composition P1 (HIPS masterbatch) was prepared by mixing 20% by weight of zinc stearate into a molten high impact polystyrene A1 having a melt flow rate of 8 g/10 min (measured according to ASTM D 1238, 200° C./5 kg) and a rough rubber content of 9.3%, where rubber is in the form of well-distributed spheres with an average particle size of 2 µm. The polymer composition P1 was obtained in form of cylindrical pellets with diameter and length both about 3,200 µm.

In a second step, this polymer composition P1 was mixed with another HIPS product A2 having melt flow rate of 3.6 g/10 min, measured according to ASTM D 1238, 200° C./5 kg (INEOS Styrolution® PS 7800) wherein both polymer compositions are in dry solid state and P1 is incorporated at 0.35% by weight (referring to 0.07% by weight of zinc stearate, based on sum total of HIPS composition). Mixing was effected by evenly metering the concentrate pellets of P1 into the HIPS polymer A2 immediately after the polymer A2 left the pelletizing cutter.

The resultant dry blend (inventive thermoplastic molding composition P) was injection molded in plastic parts that discarded from the mold without problems.

Mold release was gauged qualitatively, wherein basically, the part ejects from the mold completely or it hangs up with incomplete ejection. The dry blend was also extruded into sheet which was likewise thermoformed into plastic articles without sticking to the mold.

Prior to molding the pellets of the inventive composition P as described above (including 0.35% by weight of HIPS master batch P1) were tested and found to shows 0.2 mm² black area/m² product. The black area (black specks) were measured as described below.

COMPARATIVE EXAMPLE

A HIPS polymer A2' corresponding to A2 (having melt flow rate of 3.6 g/10 min, measured according to ASTM D 1238, 200° C./5 kg, INEOS Styrolution® PS 7800) was produced via polymerization in the presence of 0.07% by weight zinc stearate, based on sum total of HIPS composition. The HIPS polymer A' was injection molded.

Prior to molding the pellets of the comparative HIPS polymer A2' were tested and found to shows 0.8 mm² black area/m² product. The black area (black specks) were measured as described below.

TEST METHOD

Black areas in the extruded product (black specks) were measured with an OCS brand optical analyzer (Model PS-25C optical analyzer from OCS Optical Control Systems GmbH, Witten, Germany). The system consists of a measurement unit, and the hardware and software for the evaluation of measurements. The measurement unit contains a filling device for the granular material, a vibration slide to facilitate material flow as well as a high speed CCD color camera and lighting unit. The CCD color camera is capable of 25 pictures per second with 440.000 pixels.

Overall this enables very accurate and precise evaluation of black material down to a size of 40 µm (micron).

Mechanical properties of the HIPS products are summarized in the following table:

|   | Measured according to | A1 | A2/A2' |
|---|---|---|---|
| Melt Flow Rate, 200° C./5 kg | ASTM D 1238 | 8 | 3.6 |
| Izod Notched Impact Strength, | ASTM D 256 | 2.8 | 1.5 |

-continued

| | Measured according to | A1 | A2/A2' |
|---|---|---|---|
| ft-lb/in | | | |
| Tensile Stress at Yield, psi | ASTM D 638 | 3240 | 4100 |
| Tensile Modulus, psi × 10³ | ASTM D 638 | 270 | 260 |
| Tensile Strain at Failure, % | ASTM D 638 | 50 | 25 |
| Flexural Strength, psi | ASTM D 790 | 5760 | 7550 |
| Vicat Softening Temperature (120° C/h, 10 N), ° F. | ASTM D 1525 | 208 | 214 |

The invention claimed is:

1. A method for producing a thermoplastic molding composition P comprising at least one styrene polymer and at least one lubricant B, selected from fatty acids and fatty acids derivatives, wherein the method encompasses the following steps:
   a) preparation of a polymer composition P1 consisting of
      60 to 85% by weight, based on the polymer composition P1, of at least one styrene polymer A1 having a melt flow rate in the range of 4 to 9 g/10 min, measured according to ASTM D 1238, 200° C./5 kg, wherein the styrene polymer A1 is selected from high-impact polystyrenes and standard polystyrenes; and
      15 to 40% by weight, based on the polymer composition P1, of at least one lubricant B selected from fatty acids and fatty acid derivatives;
   by mixing the at least one lubricant B into the molten styrene polymer A1 and cooling the mixture, wherein particles made of polymer composition P1 are obtained;
   b) preparation of a polymer composition P2 by mixing the particles made of polymer composition P1 obtained in step a) with at least one styrene polymer A2 and optionally one or more further additives C;
   wherein the at least one styrene polymer A2 is different from the at least one styrene polymer A1 and wherein the at least one styrene polymer A2 has a melt flow rate which is lower than the melt flow rate of the at least one styrene polymer A1;
   wherein the thermoplastic molding composition P does not comprise any lubricant selected from fatty acids and fatty acid derivatives beside the lubricant B incorporated in the polymer composition P1.

2. The method of claim 1, wherein the styrene polymers A1 and A2 are selected from high-impact polystyrenes and standard polystyrenes.

3. The method of claim 1, wherein the styrene polymers A1 and/or A2 are selected from high-impact polystyrenes comprising a polystyrene matrix and at least one impact modifying polymer selected from butadiene rubbers and styrene-butadiene rubbers.

4. The method of claim 1, wherein the at least one lubricant B is selected from stearic acid and metal stearates.

5. The method of claim 1, wherein the polymer composition P1 comprises:
   70 to 85% by weight, based on the polymer composition P1, of at least one styrene polymer A1, selected from standard polystyrenes or high impact polystyrenes having a melt flow rate in the range of 4 to 9 g/10 min, measured according to ASTM D 1238, 200° C./5 kg; and
   15 to 30% by weight, based on the polymer composition P1, of at least one lubricant B selected from metal stearates and stearic acid.

6. The method of claim 1, wherein the thermoplastic molding composition P comprises:
   0.01 to 20% by weight, based on the composition P, of the polymer composition P1;
   80 to 99.99% by weight, based on the composition P, of the at least one styrene polymer A2; and optionally
   0 to 19.99% by weight, based on the composition P, of one or more further additives C.

7. The method of claim 1, wherein the polymer composition P1 is obtained in the form of solid particles having an average particle size in the range of 500 to 10,000 µm.

8. The method of claim 1, wherein the mixing in step b) is effected by mixing the particles made of polymer composition P1 and particles comprising the at least one styrene polymer A2, wherein the particles are in solid state during the mixing process.

9. A thermoplastic molding composition P comprising:
   0.01 to 20% by weight, based on the composition P, of solid particles made of polymer composition P1 consisting of:
      60 to 85% by weight, based on polymer composition P1, of at least one styrene polymer A1 having a melt flow rate, measured according to ASTM D 1238, 200° C./5 kg, in the range of 4 to 9 g/10 min, wherein the styrene polymer A1 is selected from high-impact polystyrenes and standard polystyrenes; and
      15 to 40% by weight, based on polymer composition P1, of at least one lubricant B selected from fatty acids and fatty acid derivatives;
   80 to 99.99% by weight, based on the composition P, of solid particles comprising at least one styrene polymer A2; and optionally
   0 to 19.99% by weight, based on the composition P, of one or more further additives C;
   wherein the at least one styrene polymer A2 is different from the at least one styrene polymer A1 and wherein the at least one styrene polymer A2 has a melt flow rate which is lower than the melt flow rate of the at least one styrene polymer A1;
   wherein the thermoplastic molding composition P does not comprise any lubricant selected from fatty acids and fatty acid derivatives beside the lubricant B incorporated in the polymer composition P1.

10. The thermoplastic molding composition P of claim 9 comprising:
   0.1 to 5% by weight, based on the composition P, of solid particles made of polymer composition P1 consisting of:
      70 to 85% by weight, based on the polymer composition P1, of at least one styrene polymer A1, selected from standard polystyrenes or high impact polystyrenes, having a melt flow rate, measured according to ASTM D 1238, 200° C./5 kg, in the range of 2 to 10 g/10 min; and
      15 to 30% by weight, based on the polymer composition P1, of at least one lubricant B selected from stearic acid and metal stearates;
   95 to 99.9% by weight, based on the composition P, of solid particles comprising at least one styrene polymer A2; and optionally
   0 to 4.9% by weight, based on the composition P, of one or more further additives C;
   wherein the solid particles made of polymer composition P1 have an average particle size in the range of 500 to 10,000 µm, and wherein the at least one lubricant B is homogenous distributed in the solid particles made of polymer composition P1.

11. The thermoplastic molding composition P of claim 9, wherein the thermoplastic molding composition P shows a content of black specks contamination of about or less than 0.6 mm$^2$ black area/m$^2$ product.

12. A thermoplastic molding composition P comprising:
   solid particles made of polymer composition P1 consisting of:
      60 to 85% by weight, based on the polymer composition P1, of at least one styrene polymer A1, having a melt flow rate, measured according to ASTM D 1238, 200° C./5 kg, in the range of 4 to 9 g/10 min, wherein the styrene polymer A1 is selected from high-impact polystyrenes and standard polystyrenes; and
      15 to 40% by weight, based on the polymer composition P1, of at least one lubricant B selected from fatty acids and fatty acid derivatives;
   solid particles comprising at least one styrene polymer A2; and optionally
   one or more further additives C;
wherein the at least one styrene polymer A2 is different from the at least one styrene polymer A1 and wherein the at least one styrene polymer A2 has a melt flow rate which is lower than the melt flow rate of the at least one styrene polymer A1;
wherein the thermoplastic molding composition P does not comprise any lubricant selected from fatty acids and fatty acid derivatives beside the lubricant B incorporated in the polymer composition P1.

13. The thermoplastic molding composition P of claim 12, wherein the solid particles made of polymer composition P1 have an average particle size in the range of 500 to 10,000 μm and the at least one lubricant B is homogenous distributed in a matrix of styrene polymer A1.

14. A method for producing a mold, wherein the polymer composition P1 of claim 12 is mixed with the at least one styrene polymer A2 and subjected to an injection molding process.

15. A method for the preparation of an extruded sheet that is thermoformed into molded articles, wherein the extruded sheet comprises a polymer composition of claim 9.

16. A method for the preparation of an extruded sheet that is thermoformed into molded articles, wherein the extruded sheet comprises a thermoplastic molding composition P of claim 12.

17. The method of claim 6, wherein the thermoplastic molding composition P comprises:
   0.01 to 1% by weight, based on the composition P, of the polymer composition P1;
   99 to 99.99% by weight, based on the composition P, of the at least one styrene polymer A2; and optionally
   0 to 0.9% by weight, based on the composition P, of one or more further additives C.

18. The thermoplastic molding composition P of claim 9 comprising:
   0.1 to 1% by weight, based on the composition P, of solid particles made of polymer composition;
   99 to 99.9% by weight, based on the composition P, of solid particles comprising at least one styrene polymer A2; and optionally
   0 to 0.9% by weight, based on the composition P, of one or more further additives C.

19. The thermoplastic molding composition P of claim 10 comprising:
   0.1 to 1% by weight, based on the composition P, of solid particles made of polymer composition;
   99 to 99.9% by weight, based on the composition P, of solid particles comprising at least one styrene polymer A2; and optionally
   0 to 0.9% by weight, based on the composition P, of one or more further additives C.

20. The thermoplastic molding composition P of claim 12 comprising:
   0.1 to 1% by weight, based on the composition P, of solid particles made of polymer composition;
   99 to 99.9% by weight, based on the composition P, of solid particles comprising at least one styrene polymer A2; and optionally
   0 to 0.9% by weight, based on the composition P, of one or more further additives C.

* * * * *